US010401235B2

(12) United States Patent
Coutts et al.

(10) Patent No.: US 10,401,235 B2
(45) Date of Patent: Sep. 3, 2019

(54) THERMAL SENSOR PLACEMENT FOR HOTSPOT INTERPOLATION

(71) Applicant: QUALCOMM Incorporated, San Diego, CA (US)

(72) Inventors: Ryan Michael Coutts, Carlsbad, CA (US); Rajat Mittal, San Diego, CA (US); Mehdi Saeidi, San Diego, CA (US); Paul Ivan Penzes, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 697 days.

(21) Appl. No.: 14/852,350

(22) Filed: Sep. 11, 2015

(65) Prior Publication Data

US 2017/0074729 A1    Mar. 16, 2017

(51) Int. Cl.
| | |
|---|---|
| *G01K 13/00* | (2006.01) |
| *G05B 15/02* | (2006.01) |
| *G06F 1/04* | (2006.01) |
| *G06F 1/3206* | (2019.01) |
| *G06F 11/30* | (2006.01) |
| *G06F 1/20* | (2006.01) |
| *G06F 1/324* | (2019.01) |
| *G06F 1/3296* | (2019.01) |

(52) U.S. Cl.
CPC .......... *G01K 13/00* (2013.01); *G05B 15/02* (2013.01); *G06F 1/04* (2013.01); *G06F 1/206* (2013.01); *G06F 1/3206* (2013.01); *G06F 11/3058* (2013.01); *G06F 11/3093* (2013.01); *G06F 1/324* (2013.01); *G06F 1/3296* (2013.01); *G06F 2201/81* (2013.01); *Y02D 10/126* (2018.01); *Y02D 10/16* (2018.01)

(58) Field of Classification Search
CPC .......... G01K 13/00; G06F 1/206; G06F 1/04; G06F 11/3058; G06F 1/3206; G06F 11/3093; G06F 2201/81; G06F 1/3296; G06F 1/324; G05B 15/02
USPC ........................................................ 700/269
See application file for complete search history.

(56) References Cited

U.S. PATENT DOCUMENTS

| | | | |
|---|---|---|---|
| 5,015,102 A | 5/1991 | Yamaguchi | |
| 7,520,669 B2 | 4/2009 | Yazawa et al. | |
| 7,695,188 B2 | 4/2010 | Sri-Jayantha et al. | |
| 8,972,759 B2 * | 3/2015 | Doshi | G06F 1/3203 713/320 |

(Continued)

FOREIGN PATENT DOCUMENTS

GB    2337121 B    7/2002

OTHER PUBLICATIONS

International Search Report and Written Opinion—PCT/US2016/049300—ISA/EPO—Nov. 23, 2016.

*Primary Examiner* — Bo Fan
(74) *Attorney, Agent, or Firm* — Loza & Loza, LLP

(57) ABSTRACT

In one embodiment, a temperature management system comprises a plurality of thermal sensors at different locations on a chip, and a temperature manager. The temperature manager is configured to receive a plurality of temperature readings from the thermal sensors, to fit a quadratic temperature model to the received temperature readings, and to estimate a hotspot temperature on the chip using the fitted quadratic temperature model.

19 Claims, 12 Drawing Sheets

(56) References Cited

U.S. PATENT DOCUMENTS

| | | | |
|---|---|---|---|
| 2006/0013281 A1* | 1/2006 | Sri-Jayantha | G06F 1/206 374/163 |
| 2007/0191993 A1 | 8/2007 | Wyatt | |
| 2008/0092644 A1* | 4/2008 | Hasebe | G01F 1/6847 73/204.11 |
| 2008/0234953 A1* | 9/2008 | Ignowski | G06F 1/206 702/60 |
| 2010/0010741 A1* | 1/2010 | Tener | F41G 7/34 701/500 |
| 2010/0073068 A1 | 3/2010 | Cho et al. | |
| 2011/0301777 A1 | 12/2011 | Cox et al. | |
| 2013/0049708 A1* | 2/2013 | Nakayama | H02P 9/107 322/34 |
| 2013/0073245 A1 | 3/2013 | Bhagwat et al. | |
| 2013/0151191 A1 | 6/2013 | Ranieri et al. | |

\* cited by examiner

THERMAL SENSOR PLACEMENT FOR HOTSPOT INTERPOLATION

BACKGROUND

Field

Aspects of the present disclosure relate generally to temperature sensing, and more particularly, to estimating a hotspot temperature.

Background

Due to increases in chip (integrated circuit) integration and operating frequencies, power densities in chips have dramatically increased, resulting in higher chip temperatures. As a result, temperature management is playing an increasingly important role in protecting chips from damage due to overheating.

In this regard, thermal sensors may be integrated on a chip to monitor temperature at various locations on the chip. Temperature readings from the thermal sensors may be input to a temperature manager that manages blocks (e.g., central processing units (CPUs)) on the chip based on the temperature readings to prevent excessive power leakage and/or thermal runaway. Thermal runaway occurs when increases in temperature cause increases in leakage power, which, in turn, cause further increases in temperature. This positive feedback can cause the temperature of the chip to rapidly rise, potentially damaging the chip.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to a first aspect, a temperature management system is provided. The temperature management system comprises a plurality of thermal sensors at different locations on a chip, and a temperature manager. The temperature manager is configured to receive a plurality of temperature readings from the thermal sensors, to fit a quadratic temperature model to the received temperature readings, and to estimate a hotspot temperature on the chip using the fitted quadratic temperature model.

A second aspect relates to a method for managing temperature. The method comprises receiving a plurality of temperature readings from a plurality of thermal sensors, wherein the thermal sensors are at different locations on a chip. The method also comprises fitting a quadratic temperature model to the received temperature readings, and estimating a hotspot temperature on the chip using the fitted quadratic temperature model.

A third aspect relates to an apparatus for managing temperature. The apparatus comprises means for receiving a plurality of temperature readings from a plurality of thermal sensors, wherein the thermal sensors are at different locations on a chip. The apparatus also comprises means for fitting a quadratic temperature model to the received temperature readings, and means for estimating a hotspot temperature on the chip using the fitted quadratic temperature model.

A fourth aspects relates to a computer-readable medium comprising instructions stored thereon. When executed by a processor, the instructions cause the processor to receive a plurality of temperature readings from a plurality of thermal sensors, wherein the thermal sensors are at different locations on a chip, to fit a quadratic temperature model to the received temperature readings, and to estimate a hotspot temperature on the chip using the fitted quadratic temperature model.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Thermal sensors may be integrated on a chip to monitor temperature at various locations on the chip. Temperature readings from the thermal sensors may be input to a temperature manager that manages blocks (e.g., central processing units (CPUs)) on the chip based on the temperature readings to prevent excessive power leakage and/or thermal runaway. For example, when a temperature reading reaches a temperature threshold, the temperature manager may take steps to reduce the temperature such as throttling back (reducing) the operating frequency of a CPU. This reduces the temperature by reducing the dynamic power dissipation of the CPU.

Figure 1:
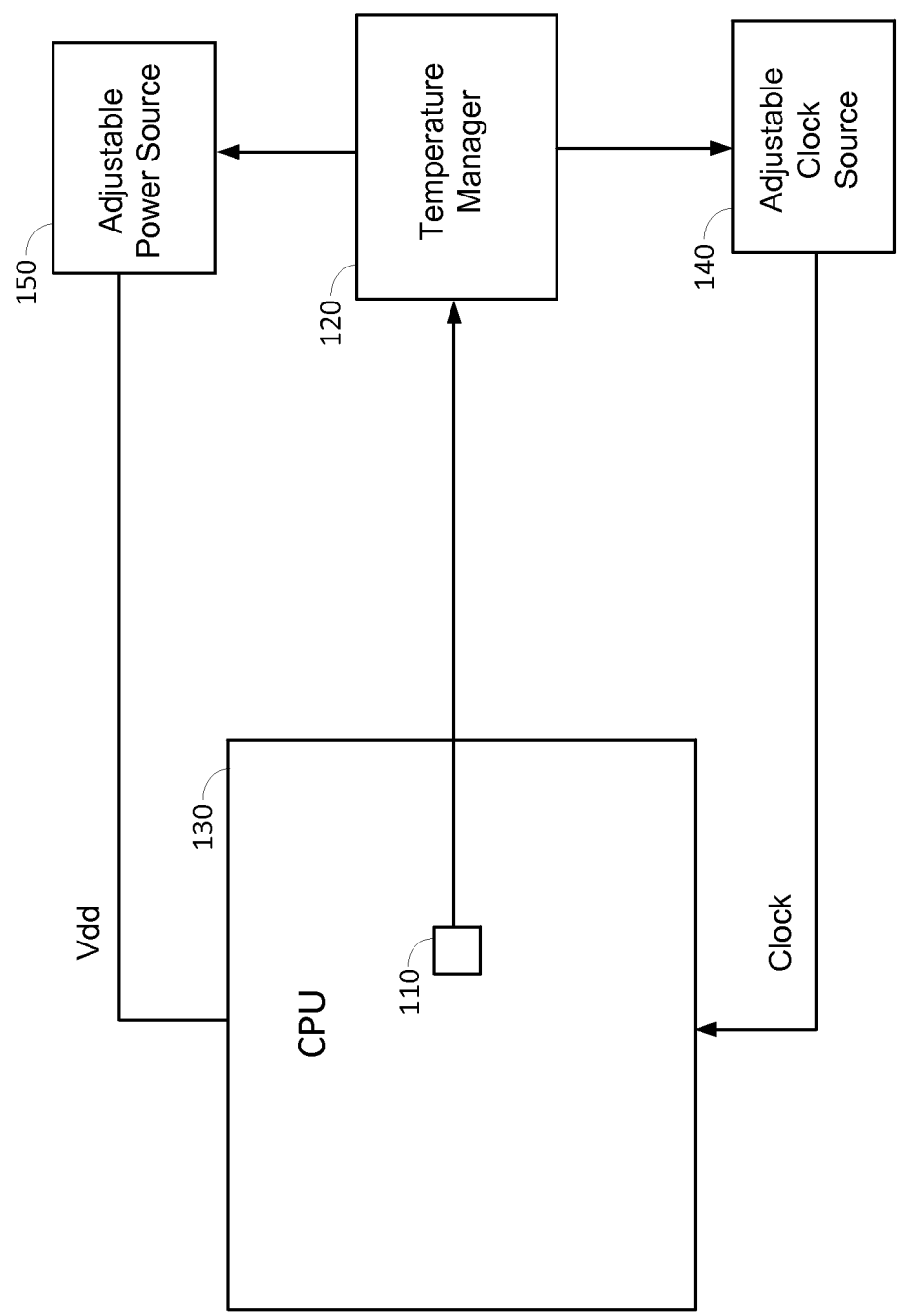
FIG. 1 shows an exemplary temperature management system according to certain aspects of the present disclosure.

FIG. 1 shows an exemplary temperature management system according to certain aspects of the present disclosure. The temperature management system may comprise one or more thermal sensors 110, a temperature manager 120, an adjustable clock source 140, and an adjustable power source 150.

The thermal sensor 110 may be configured to measure temperature within a CPU 130 or other type of circuit, and output corresponding temperature readings to the temperature manager 120. The thermal sensor 110 may be integrated in the CPU 130, as shown in FIG. 1.

The adjustable clock source 140 is configured to generate a clock signal for the CPU 130, and to adjust the frequency of the clock signal under the control of the temperature manager 120. The clock signal is output to the CPU 130, which the CPU 130 may use for switching (toggling) transistors in the CPU 130. In this example, the frequency of the clock signal may correspond to an operating frequency of the CPU 130. Thus, the temperature manager 120 can adjust (scale) the operating frequency of the CPU 130 by adjusting the frequency of the clock signal output by the clock source 140.

The adjustable power source 150 is configured to provide an adjustable supply voltage (denoted "Vdd") to the CPU 130, and to adjust the supply voltage Vdd under the control of the temperature manager 120. The power source 150 may comprise a power management integrated circuit (PMIC). The CPU 130 may use the supply voltage Vdd to power devices (e.g., transistors) in the CPU 130. Thus, the temperature manager 120 can adjust (scale) the supply voltage of the CPU 130 by adjusting the supply voltage Vdd provided to the CPU 130 from the power source 150.

In operation, the temperature manager 120 monitors the temperature of the CPU 130 using the temperature readings from the thermal sensor 110. If the temperature rises above a temperature threshold, the temperature manager 120 may initiate temperature mitigation, in which the temperature manager 120 takes action to reduce the temperature of the CPU 130. The temperature manager 120 may reduce the temperature by reducing the operating frequency of the CPU 130, reducing the supply voltage Vdd, or both. Reducing the operating frequency, the supply voltage Vdd, or both reduces the temperature by reducing the dynamic power dissipation of the CPU 130, which is approximately proportional to the operating frequency and the square of the supply voltage Vdd.

In a conventional approach, thermal sensors are placed as close as possible to one or more thermal hotspots on a chip. As used herein, a "hotspot" is a hottest spot in a given area of the chip at a given time. The area may be the area of a CPU on the chip, the area of another block (e.g., modem, a memory, a processor, etc.) on the chip, the area of the entire chip, etc.

A problem with the conventional approach is that a hotspot typically occurs in a very active and densely populated region of the chip (e.g., at or near the center of a CPU on the chip). Therefore, placing a thermal sensor near the hotspot may interference with the design of the chip and negatively impact chip performance. Also, the hotspot may move within the chip over time (e.g., depending on use case), making it difficult to locate the hotspot and get an accurate temperature measurement of the hotspot.

As a result, a margin needs to be budgeted into a temperature reading from a thermal sensor to account for the worst case difference between the temperature reading and the temperature of the hotspot. For example, if the temperature manager 120 is configured to initiate temperature mitigation when the hotspot temperature reaches 90 degrees Celsius, the temperature manager 120 may initiate temperature mitigation when a temperature reading from the thermal sensor reaches 75 degrees Celsius. In this example, a 15 degree margin is budgeted into the temperature reading. A problem with this approach is that the difference between the temperature reading and the hotspot temperature may be less than the worst case difference in most cases. As a result, the temperature manager 120 may initiate temperature mitigation while the hotspot temperature is still below 90 degrees Celsius. Initiating temperature mitigation too soon unnecessarily reduces chip performance. This is because temperature mitigation typically may involve reducing the operating frequency of a CPU on the chip, which lowers the performance (e.g., processing speed) of the CPU.

Embodiments of the present disclosure enable a temperature manager to estimate the temperature of a hotspot (hotspot temperature) on a chip without requiring that a thermal sensor be placed at the hotspot. Instead of placing a single thermal sensor at the hotspot, several thermal sensors may be placed around the hotspot. The temperature manager receives temperature readings from the sensors, and fits a temperature model of the chip to the temperature readings. After fitting the temperature model to the temperature readings, the temperature manager may use the temperature model to estimate the hotspot temperature on the chip, as discussed further below. For the example in which the hotspot is in a CPU on the chip, an advantage of placing the sensors away from the hotspot is that there is typically a large amount of open space (e.g., filler area) around the CPU. This allows the sensors to be placed away from critical paths in the CPU, minimizing interference with operations of the CPU.

Figure 2:
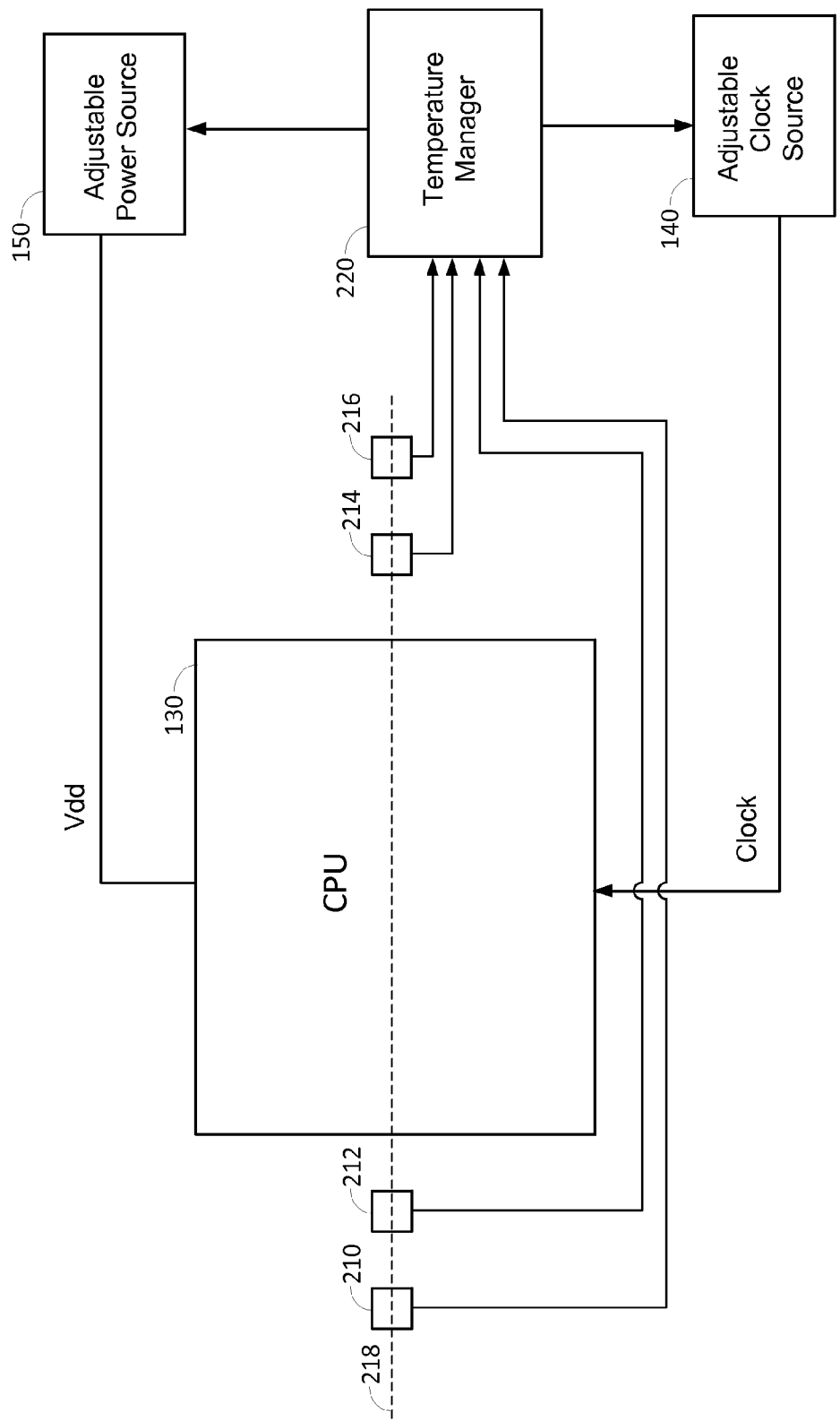
FIG. 2 shows an exemplary temperature management system comprising thermal sensors placed on opposite sides of a CPU according to certain aspects of the present disclosure.

FIG. 2 shows a temperature management system according to certain aspects of the present disclosure. In this example, the temperature management system comprises thermal sensors 210, 212, 214 and 216 placed outside the CPU 130. More particularly, the temperature management system includes first and second sensors 210 and 212 located on one side of the CPU 130, and third and fourth sensors 214 and 216 located on the opposite side of the CPU 130. In this example, the thermal sensors 210, 212, 214 and 216 are approximately aligned along a line 218 intersecting the CPU 130, as shown in FIG. 2. The line 218 may be positioned so that the line 218 intersects an estimated hotspot location in the CPU 130. For example, the line 218 may be positioned to intersect the center of the CPU 130 (as shown in the example in FIG. 2) if the hotspot is expected to occur at or near the center of the CPU 130.

In operation, each of the thermal sensors 210, 212, 214 and 216 measures temperature at its location, and sends the corresponding temperature readings to the temperature manager 220. The temperature manager 220 may be configured to fit a temperature model of the chip to the temperature readings received from the thermal sensors. The fitted temperature model allows the temperature manager 220 to interpolate temperatures at locations between the thermal sensors, and therefore estimate the hotspot temperature in the CPU 130, as discussed further below.

Figure 3:
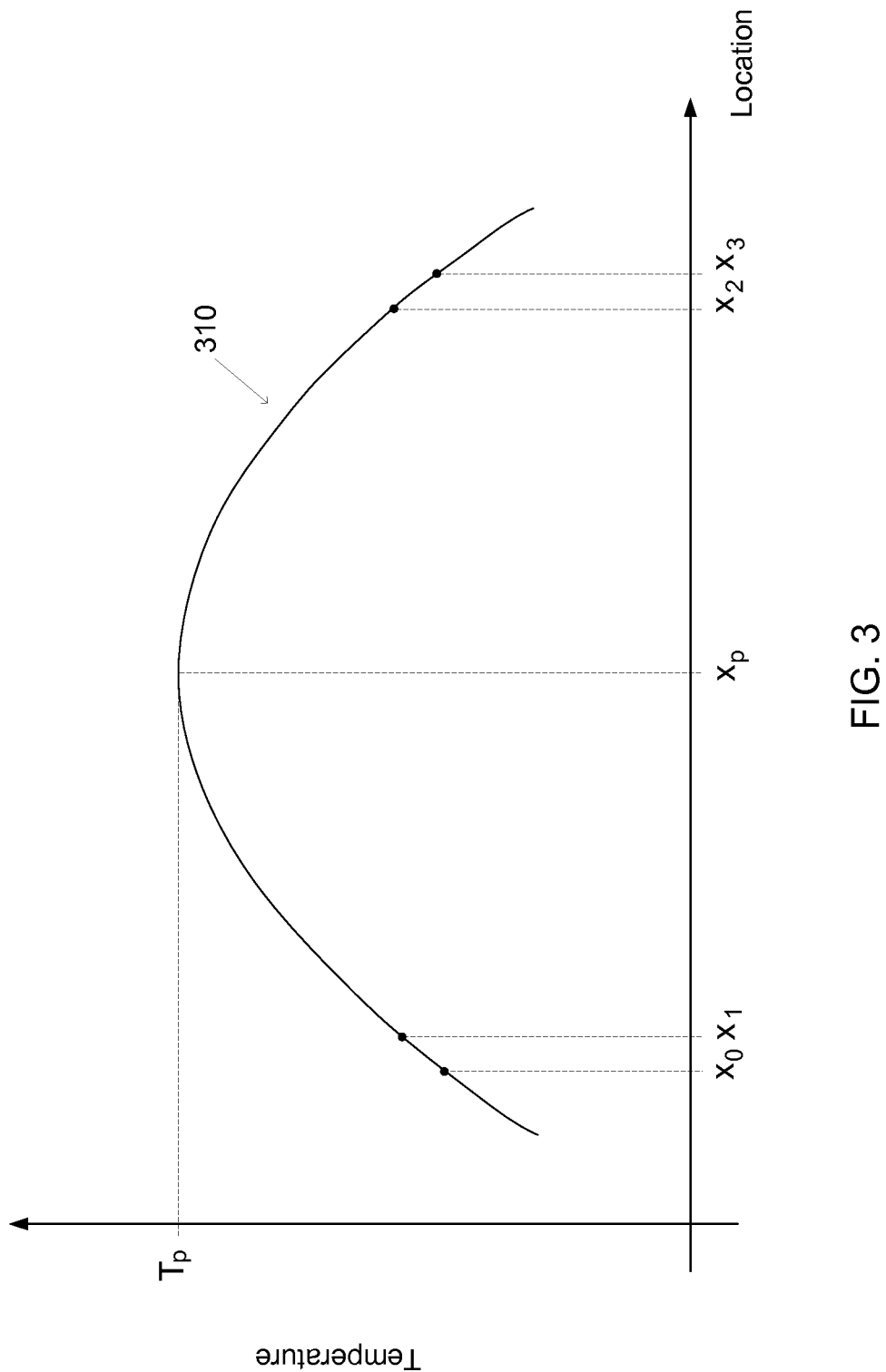
FIG. 3 is a plot illustrating an exemplary temperature curve according to certain aspects of the present disclosure.

An example of this is illustrated in FIG. 3, which shows an exemplary plot of temperature along line 218 shown in FIG. 2. As shown in FIG. 3, the temperature readings from the thermal sensors 210, 212, 214 and 216 indicate the temperatures at the known locations of the thermal sensors 210, 212, 214 and 216 along line 218 (denoted $x_0$, $x_1$, $x_2$ and $x_3$, respectively). The temperature manager 220 then fits a temperature model to the temperature readings. In the example in FIG. 3, the temperature model comprises a quadratic curve 310 that is fitted to the temperature readings from the thermal sensors using, for example, regression or another technique. The quadratic curve 310 provides a good estimate of temperature along line 218 since the temperature gradient of the chip (die) is approximately quadratic. As shown in FIG. 3, the curve 310 is concave with a peak temperature $T_p$ located within the CPU 130.

After fitting the temperature model to the temperature readings, the temperature manager 220 may estimate the hotspot temperature using the model. In the example in FIG. 3, the temperature manager 220 may estimate the hotspot temperature by calculating the peak temperature $T_p$ on the curve 310, and using the peak temperature $T_p$ as an estimate of the hotspot temperature. As shown in FIG. 3, the peak temperature $T_p$ on the curve 310 occurs at location $x_p$, which is within the CPU 130. Thus, the peak temperature $T_p$ provides an accurate estimate of the hotspot temperature in the CPU 130, assuming the hotspot is located on or near line 218. After estimating the hotspot temperature (e.g., peak temperature $T_p$), the temperature manager 220 may use the estimated hotspot temperature to perform temperature management, as discussed further below.

In certain aspects, the temperature model may comprise a quadratic curve given by the following equation:

$$T(x) = a_0 + a_1 x + a_2 x^2 \quad \text{(Eq. 1)}$$

where $T(x)$ is temperature as a function of location x (e.g., along line 218), and $a_0$, $a_1$ and $a_2$ are coefficients of the curve. Equation (1) can be written in matrix form for four temperature readings corresponding to four different sensor locations (e.g., along line 218) as follows:

$$\begin{bmatrix} T(x_0) \\ T(x_1) \\ T(x_2) \\ T(x_3) \end{bmatrix} = \begin{bmatrix} a_0 + a_1 x_0 + a_2 x_0^2 \\ a_0 + a_1 x_1 + a_2 x_1^2 \\ a_0 + a_1 x_2 + a_2 x_2^2 \\ a_0 + a_1 x_3 + a_2 x_3^2 \end{bmatrix} \quad \text{(Eq. 2)}$$

where $T(x_0)$ is the temperature reading at sensor location $x_0$ (e.g., location of the first sensor 210), $T(x_1)$ is the temperature reading at sensor location $x_1$ (e.g., location of the second sensor 212), $T(x_2)$ is the temperature reading at sensor location $x_2$ (e.g., location of the third sensor 214), and $T(x_3)$ is the temperature reading at sensor location $x_3$ (e.g., location of the fourth sensor 216). The temperature manager 220 may solve for the coefficients $a_0$, $a_1$ and $a_2$ of the temperature model using the temperatures readings from the thermal sensors based on equation (2), and therefore fit the temperature model to the temperature readings. This is possible because the number of equations in the matrix of equation (2) (i.e., four equations) is greater than the number of unknowns (i.e., the three coefficients $a_0$, $a_1$ and $a_2$). For instance, the temperature manager 220 may solve for the coefficients $a_0$, $a_1$ and $a_2$ according to the following equation:

$$A = TX^{-1} \quad \text{(Eq. 3)}$$

where A is a matrix comprising the coefficients being solved, T is a temperature matrix comprising the temperature readings at the sensor locations (e.g., four sensor locations), and $X^{-1}$ is a pseudo inverse of a matrix comprising the sensor locations.

It is to be appreciated that fitting the temperature model to the temperature readings from the thermal sensors does not require that the curve 310 exactly fit the temperature readings. For example, there may be small errors between the curve 310 and one or more of the temperature readings. In this example, the temperature manager 220 may determine coefficients $a_0$, $a_1$ and $a_2$ for the curve 310 that minimize the errors between the curve 310 and the temperature readings (e.g., determine coefficients $a_0$, $a_1$ and $a_2$ that best fit the curve 310 to the temperature readings).

Once the coefficients $a_0$, $a_1$ and $a_2$ are determined, the temperature manager 220 may determine the location of the peak temperature according to the following equation:

$$x_p = \frac{a_1}{2a_2} \quad \text{(Eq. 4)}$$

where $x_p$ is the location of the peak temperature. Equation (4) is derived by calculating the derivative of equation (1) with respect to x, setting the derivative equal to zero, and solving for x. After determining the peak location $x_p$, the temperature manager 220 may determine the peak temperature by inputting the peak location $x_p$ and determined coefficients $a_0$, $a_1$ and $a_2$ into equation (1), and solving for temperature.

In certain aspects, the temperature manager 220 may receive temperature readings from the thermal sensors on a periodic basis, and estimate the hotspot temperature each time the temperature manager 220 receives temperature readings from the thermal sensors, as discussed above. This allows the temperature manager 220 to monitor the hotspot temperature in the CPU 130, and perform temperature management based on the monitored hotspot temperature. For example, the temperature manager 220 may initiate temperature mitigation when the monitored hotspot temperature reaches a temperature threshold to prevent the hotspot temperature from reaching or coming close to a critical temperature (e.g., a temperature at which thermal runaway is triggered). The temperature manager 220 may perform temperature mitigation by commanding the adjustable clock source 140 to reduce (scale down) the frequency of the CPU, commanding the adjustable power source 150 to reduce the supply voltage Vdd, or both.

The temperature manager 220 is able to accurately estimate the hotspot temperature in the CPU 130 without requiring that a thermal sensor be located at or near the hotspot in the CPU 130. As a result, the margin that needs to be built into the estimated hotspot temperature to account for differences between the estimated hotspot temperature and the actual hotspot temperature is reduced. The reduced margin allows the CPU to operate at higher speed for a longer period of time before thermal mitigation is initiated, thereby improving performance.

It is to be appreciated that aspects of the present disclosure are not limited to the exemplary placement and number of thermal sensors shown in FIG. 2. For instance, the thermal manager 220 may estimate the hotspot temperature using three thermal sensors instead of four. This is because three temperature readings at three different sensor locations may be sufficient to determine the three coefficients in equation (1). In this example, one of the thermal sensors in FIG. 2 may be omitted.

Although FIG. 2 shows an example in which all of the sensors are located outside the CPU 130, it is to be appreciated that this need not be the case. For example, one or more of the sensors may be placed at known locations within the CPU. In this example, the one or more sensors may be placed in non-critical areas of the CPU to reduce interference with operations of the CPU. This is possible because aspects of the present disclosure do not require that a temperature sensor be placed at the hotspot (typically located in a critical area of the CPU) to accurately estimate the hotspot temperature.

Figure 4:
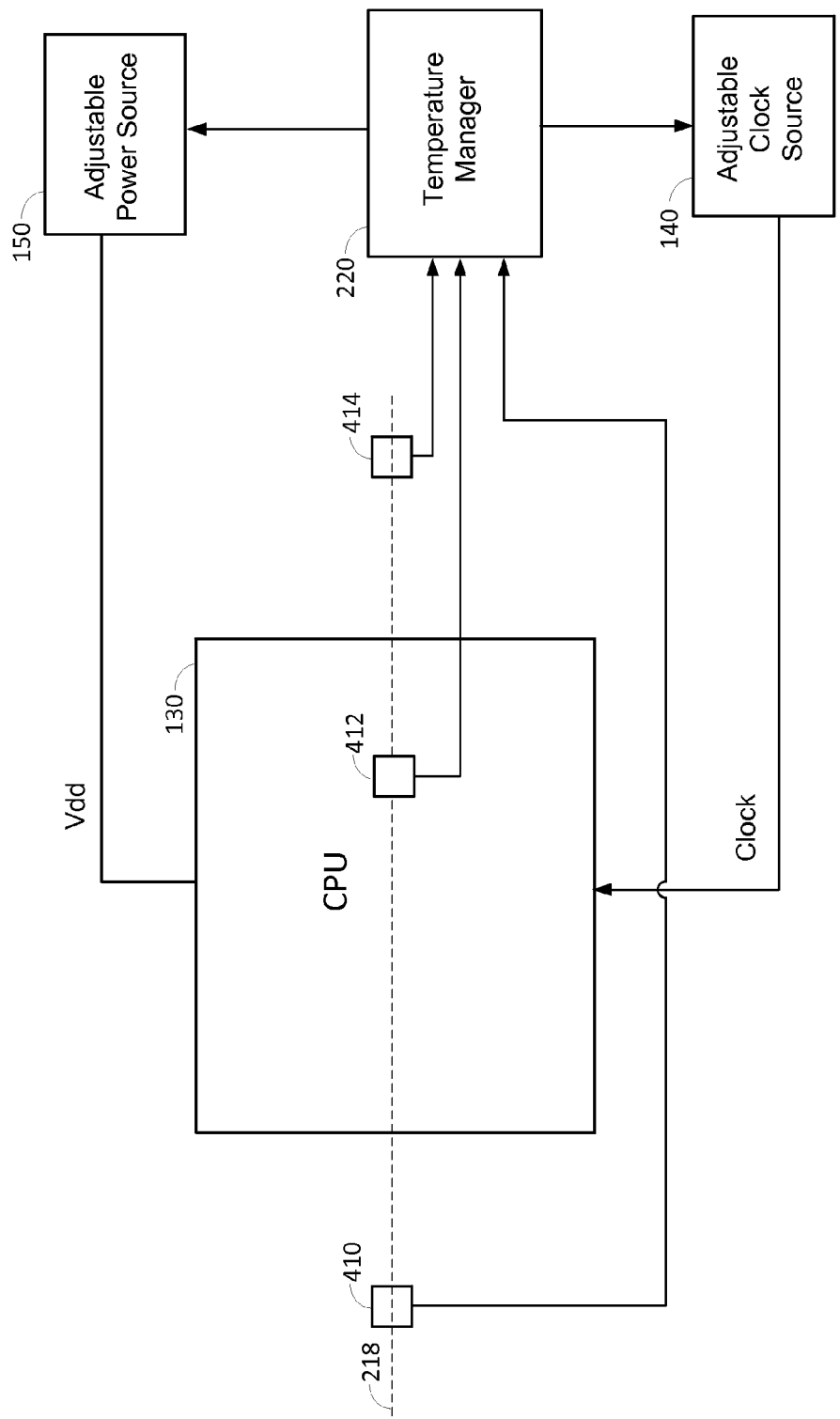
FIG. 4 shows an exemplary temperature management system comprising thermal sensors placed on opposite sides of a CPU and a thermal sensor placed inside the CPU according to certain aspects of the present disclosure.

In this regard, FIG. 4 shows an example of a temperature management system comprising three thermal sensors 410, 412 and 414 along line 218. More particularly, the temperature management system comprises two thermal sensors 410 and 414 located on opposite sides of the CPU 130, and one thermal sensor 412 located within the CPU 130. The thermal sensor 412 within the CPU 130 may be located in a non-critical area of the CPU to reduce interference with operations of the CPU, as discussed above. In this example, the temperature manager 220 may receive temperature readings from the three thermal sensors 410, 412 and 414 and fit a temperature model of the chip (e.g., temperature model given by equation (1)) to the received temperature readings. This allows the temperature manager 220 to interpolate temperatures at locations between the thermal sensors. The temperature manager 220 may then estimate the hotspot temperature by determining a peak temperature using the fitted temperature model, as discussed above.

Figure 5:
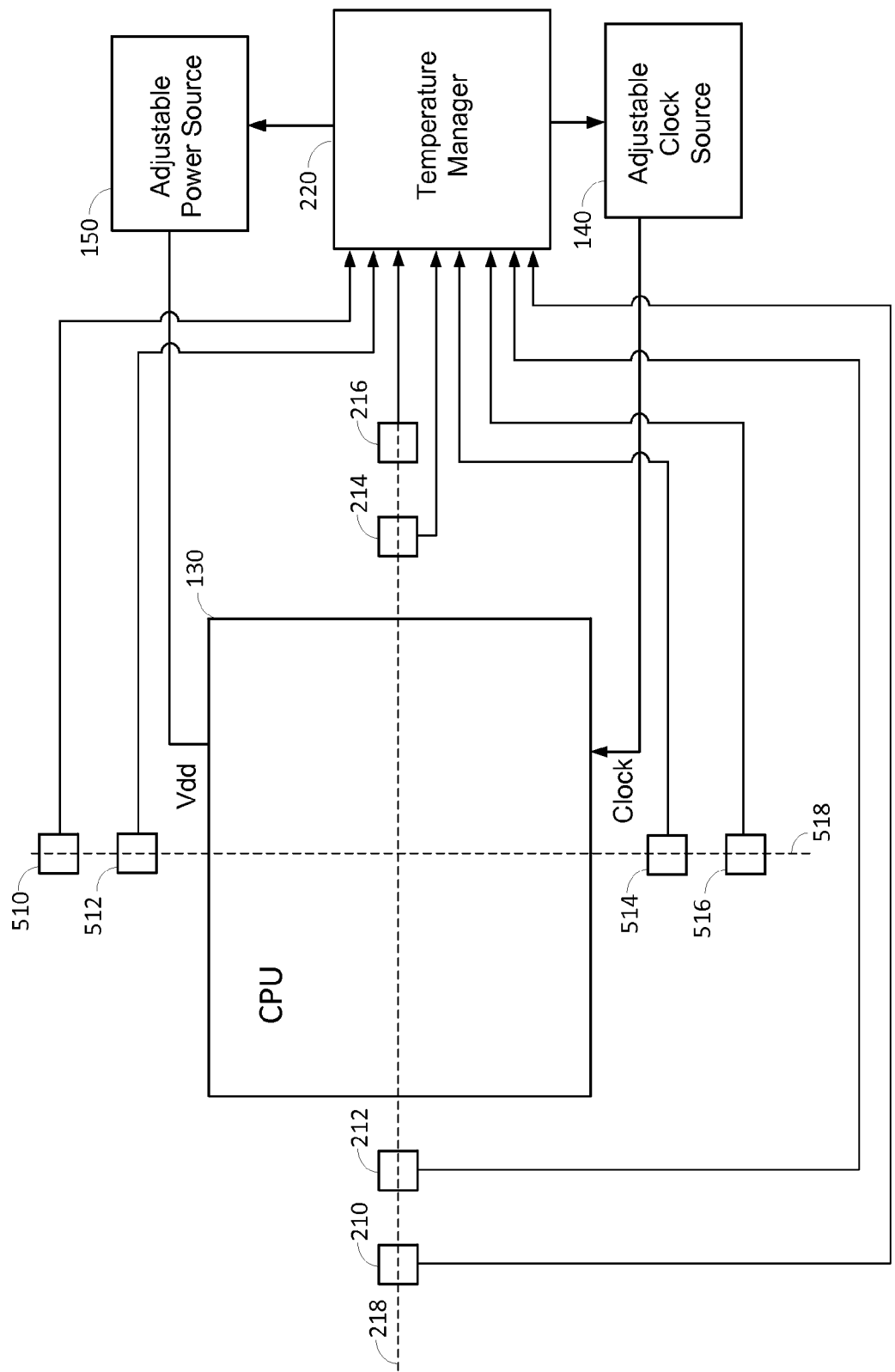
FIG. 5 shows an exemplary temperature management system comprising thermal sensors placed on each side of a CPU according to certain aspects of the present disclosure.

FIG. 5 shows a temperature management system according to certain aspects of the present disclosure. In this example, the temperature management system comprises thermal sensors on all sides of the CPU 130. More particularly, the temperature management system includes the first, second, third and fourth thermal sensors 210, 212, 214 and 216 shown in FIG. 2. In addition, the temperature management system includes fifth and sixth thermal sensors 510 and 512 located on one side of the CPU 310, and seventh and eighth thermal sensors 514 and 516 located on the opposite side of the CPU. The fifth, sixth, seventh and eight thermal sensors 510, 512, 514 and 516 are approximately aligned along a line 518 that intersects the CPU 130 and is approximately perpendicular to line 218, as shown in FIG. 5.

In operation, each of the thermal sensors 210, 212, 214, 216, 510, 512, 514 and 516 measures temperature at its location, and sends the corresponding temperature readings to the temperature manager 220. The temperature manager 220 fits a temperature model of the chip to the temperature readings, and uses the fitted temperature model to estimate the hotspot temperature of the CPU 130. In one example, the temperature model may be given by the following quadratic equation:

$$T(x, y) = a_0 + a_1 x + a_2 x^2 + a_3 y + a_4 y^2 \quad \text{(Eq. 5)}$$

where $T(x,y)$ is temperature as a function of location x,y, x is the location along the x-axis, y is the location along the y-axis, and $a_0$, $a_1$, $a_2$, $a_3$, and $a_4$ are coefficients. In this example, line 218 may be aligned with the x-axis and line 518 may be aligned with the y-axis.

In this example, the eight thermal sensors 210, 212, 214, 216, 510, 512, 514 and 516 around the CPU 130 provide the temperature manager 220 with temperature readings corresponding to eight different locations around the CPU 130. The temperature manager 220 may solve for the five coefficients $a_0$, $a_1$, $a_2$, $a_3$, and $a_4$ of the temperature model using the temperature readings received from the thermal sensors and the known locations of the temperature sensors, and therefore fit the temperature model to the temperature readings from the thermal sensors. The fitted model allows the temperature manager 220 to interpolate temperatures within the CPU 130. After fitting the temperature model to the temperature readings, the temperature manager 220 may determine a peak temperature using the model, and use the determined peak temperature as an estimate of the hotspot temperature in the CPU 130. The temperature manager 220 may then manage the temperature of the CPU 130 based on the estimated hotspot temperature, as discussed above.

The temperature manager 220 may determine the peak temperature using any one of a variety of techniques. In one example, the temperature manager 220 may determine the peak temperature by computing the derivative of equation (5) in the x and y dimensions, setting the derivative to zero to find the peak location (location of the peak temperature), and inputting the peak location into equation (5) to determine the peak temperature. In another example, the temperature manager 220 may determine the peak temperature using an iterative peak-finding algorithm such as a gradient descent algorithm. In yet another example, the temperature manager 220 may determine the peak temperature by computing the temperature for each location in a discrete set of locations using the temperature model, and selecting the highest computed temperature. To reduce computational load, the set of locations may be reduced to locations that are more likely to be at or near a hotspot (e.g., locations at or near an area of high activity in the CPU 130).

It is to be appreciated that the term "peak temperature," as used in this disclosure, is not necessarily the absolute peak temperature given by a temperature model. For example, as discussed above, the temperature manager 220 may determine the peak temperature (highest temperature) given by the model for a discrete set of locations. In this example, the determined peak temperature may approximate the absolute peak temperature given by the model if the location corresponding to the absolute peak temperature is between locations in the set of locations.

Figure 6:
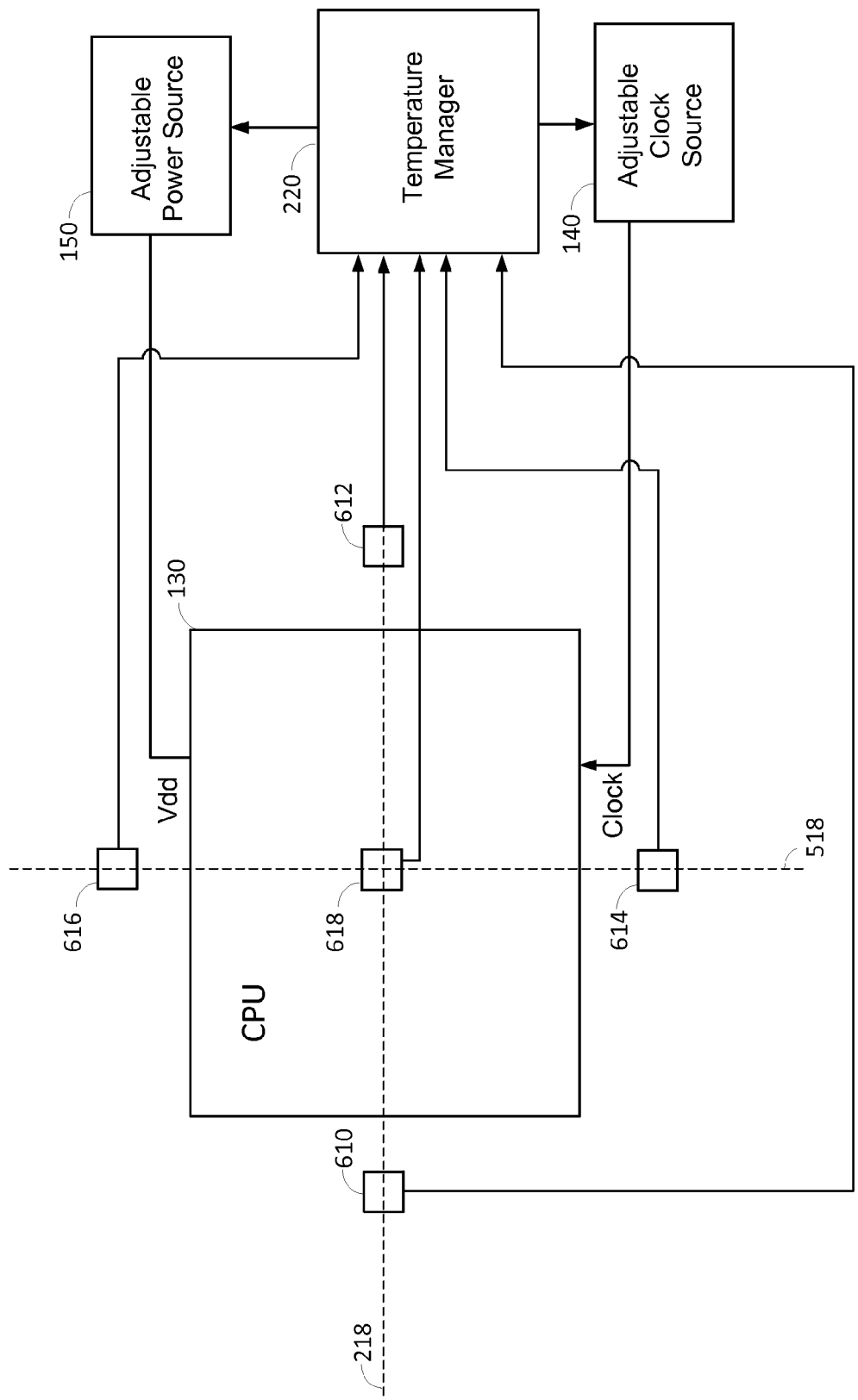
FIG. 6 shows an exemplary temperature management system comprising a thermal sensor placed on each side of a CPU and a thermal sensor placed inside the CPU according to certain aspects of the present disclosure.

It is to be appreciated that the thermal manager 220 may estimate the hotspot temperature based on equation (5) using fewer than eight sensors. In this regard, FIG. 6 shows an example of a temperature management system comprising a thermal sensor on each side of the CPU 130 and one thermal sensor within the CPU 130 for a total of five thermal sensors. More particularly, the temperature management system comprises two thermal sensors 610 and 612 along line 218, two thermal sensors 616 and 614 along line 518, and one thermal sensor 618 located approximately at the intersection of lines 218 and 518. In this example, the five thermal sensors 610, 612, 614, 616 and 618 provide temperature readings corresponding to five different sensor locations, which may be sufficient to solve for the five coefficients $a_0$, $a_1$, $a_2$, $a_3$, and $a_4$ of the temperature model given by equation (5).

In operation, the temperature manager 220 may receive temperature readings from the thermal sensors 610, 612, 614, 616 and 618, and fit a temperature model of the chip (e.g., temperature model given by equation (5)) to the received temperature readings. The temperature manager 220 may then estimate the hotspot temperature by determining a peak temperature using the fitted temperature model, as discussed above.

Although thermal sensor 618 is located at approximately the center of the CPU 130 in the example in FIG. 6, it is to be appreciated that this need not be the case. For example, thermal sensor 618 may be moved to the left or right along line 218 to move the thermal sensor 618 away from the center of the CPU 130. In this example, thermal sensors 614 and 616 may also be moved to the left or right so that thermal sensors 614, 616 and 618 remain aligned along a vertical line. In another example, thermal sensor 618 may be moved up or down along line 518 to move thermal sensor 618 away from the center of the CPU 130. In this example, thermal sensors 610 and 612 may also be moved up or down so that thermal sensors 610, 612 and 618 remain aligned along a horizontal line.

Figure 7:
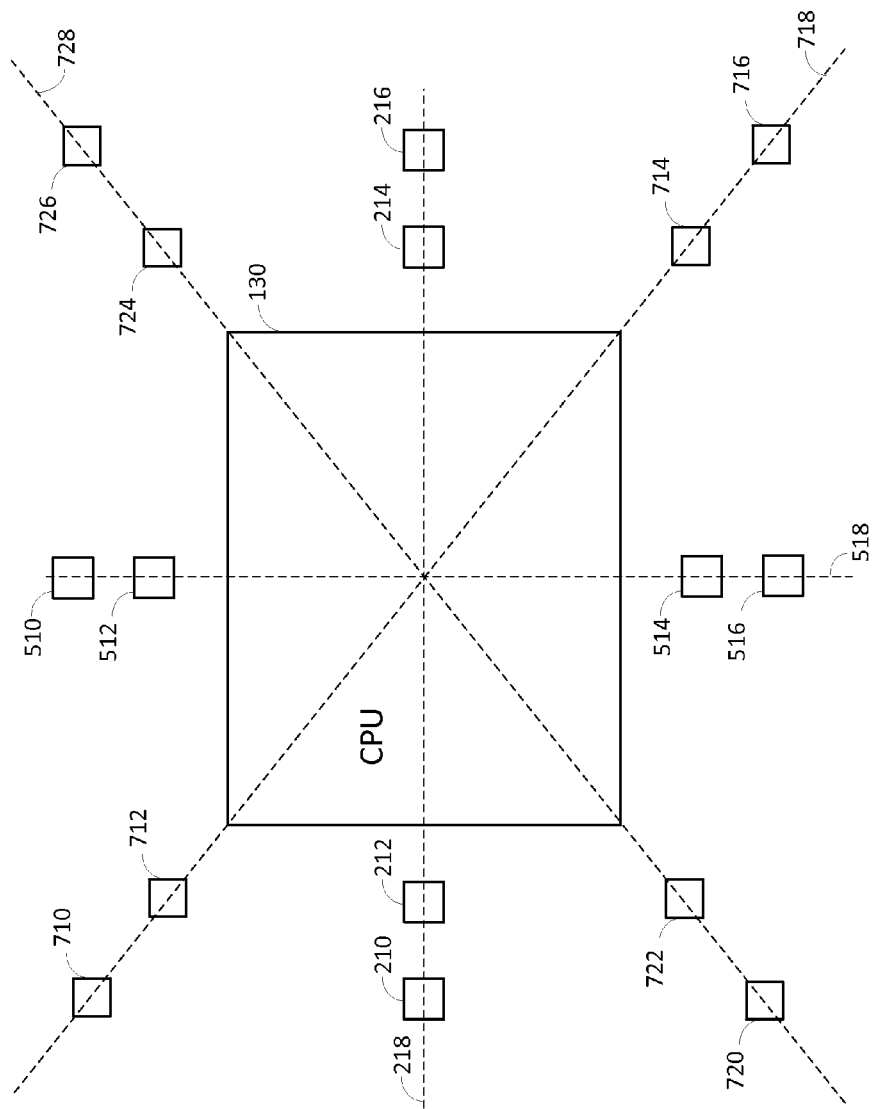
FIG. 7 shows an exemplary temperature management system comprising thermal sensors placed on each side and each corner of a CPU according to certain aspects of the present disclosure.

FIG. 7 shows a temperature management system according to certain aspects of the present disclosure. In this example, the temperature management system comprises sixteen thermal sensors around the CPU 130. More particularly, the temperature management system includes the thermal sensors 210, 212, 214, 216, 510, 512, 514 and 516 shown in FIG. 5. In addition, the temperature management system includes thermal sensors 710, 712, 714 and 716 align along a first diagonal line 718, and thermal sensors 720, 722, 724 and 726 align along a second diagonal line 728, as shown in FIG. 7. For ease of illustration, the temperature manager 220 is not shown in FIG. 7.

In operation, each of the thermal sensors measures temperature at its location, and sends the corresponding temperature readings to the temperature manager 220. The temperature manager 220 fits a temperature model of the chip to the temperature readings, and uses the fitted temperature model to estimate the hotspot temperature of the CPU 130. In one example, the temperature model may be given by the following quadratic equation:

$$T(x,y)=a_0+a_1 x+a_2 x^2+a_3 y+a_4 y^2+a_5 xy+a_6 xy^2+a_7 x^2 y+a_8 x^2 y^2 \quad \text{(Eq. 6)}$$

where $T(x,y)$ is temperature as a function of location x,y, x is the location along the x-axis, y is the location along the y-axis, and $a_0$, $a_1$, $a_2$, $a_3$, $a_4$, $a_5$, $a_6$, $a_7$ and $a_8$ are coefficients. In this example, line 218 may be aligned with the x-axis and line 518 may be aligned with the y-axis.

In this example, the temperature manager 220 may solve for the coefficients $a_0$, $a_1$, $a_2$, $a_3$, $a_4$, $a_5$, $a_6$, $a_7$ and $a_8$ of the temperature model using the temperature readings received from the thermal sensors and the known locations of the temperature sensors, and therefore fit the temperature model to the temperature readings from the thermal sensors. After fitting the temperature model to the temperature readings, the temperature manager 220 may determine a peak temperature using the model, and use the determined peak temperature as an estimate of the hotspot temperature in the CPU 130. The temperature manager 220 may determine the peak temperature using any of the techniques discussed above or other techniques. The temperature manager 220 may then manage the temperature of the CPU 130 based on the estimated hotspot temperature, as discussed above.

Figure 8:
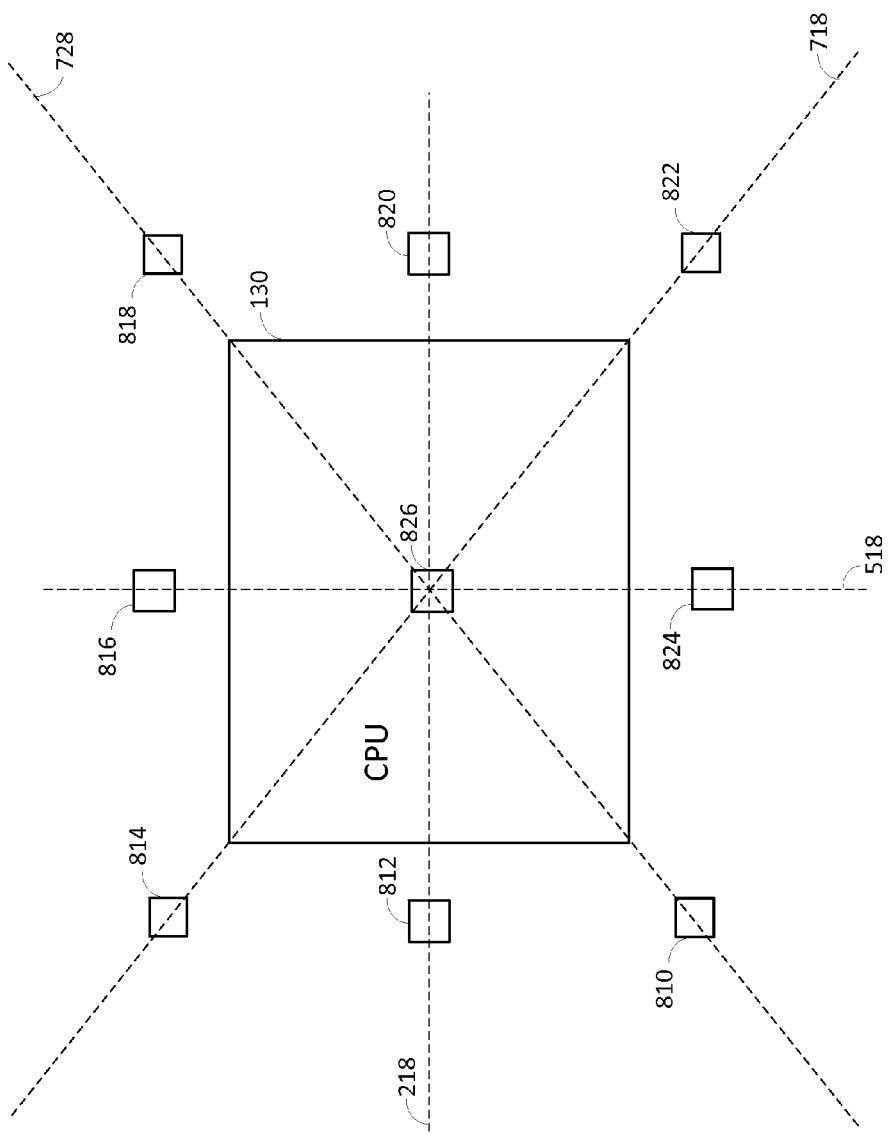
FIG. 8 shows an exemplary temperature management system comprising a thermal sensor placed on each side and each corner of a CPU and a thermal sensor placed inside the CPU according to certain aspects of the present disclosure.

It is to be appreciated that the thermal manager 220 may estimate the hotspot temperature based on equation (6) using fewer than sixteen sensors. In this regard, FIG. 8 shows an example of a temperature management system comprising a thermal sensor on each side of the CPU 130, a thermal sensor at each corner of the CPU 130, and one thermal sensor within the CPU 130 for a total of nine thermal sensors. More particularly, the temperature management system comprises two thermal sensors 812 and 820 along line 218, two thermal sensors 816 and 824 along line 518, two thermal sensors 814 and 822 along diagonal line 718, two thermal sensors 810 and 818 along diagonal line 728, and one thermal sensor 618 located approximately at the intersection of lines 218, 518, 718 and 728. In this example, the nine thermal sensors 810, 812, 814, 816, 818, 820, 822, 824 and 826 provide temperature readings corresponding to nine different sensor locations, which may be sufficient to solve for the nine coefficients $a_0$, $a_1$, $a_2$, $a_3$, and $a_4$, $a_5$, $a_6$, $a_7$ and $a_8$ of the temperature model given by equation (6).

In operation, the temperature manager 220 may receive temperature readings from the thermal sensors, and fit a temperature model of the chip (e.g., temperature model given by equation (6)) to the received temperature readings. The temperature manager 220 may then estimate the hotspot temperature by determining a peak temperature using fitted temperature model, as discussed above.

Thus, aspects of the present disclosure enable a temperature manager to estimate the temperature of a hotspot on a chip using a temperature model that is fitted to temperature readings from thermal sensors at know locations on the chip. In certain aspects, the temperature model is quadratic. This provides a good estimate of the temperature within a CPU on a chip since the temperature gradient of the chip (die) is approximately quadratic.

Figure 9:
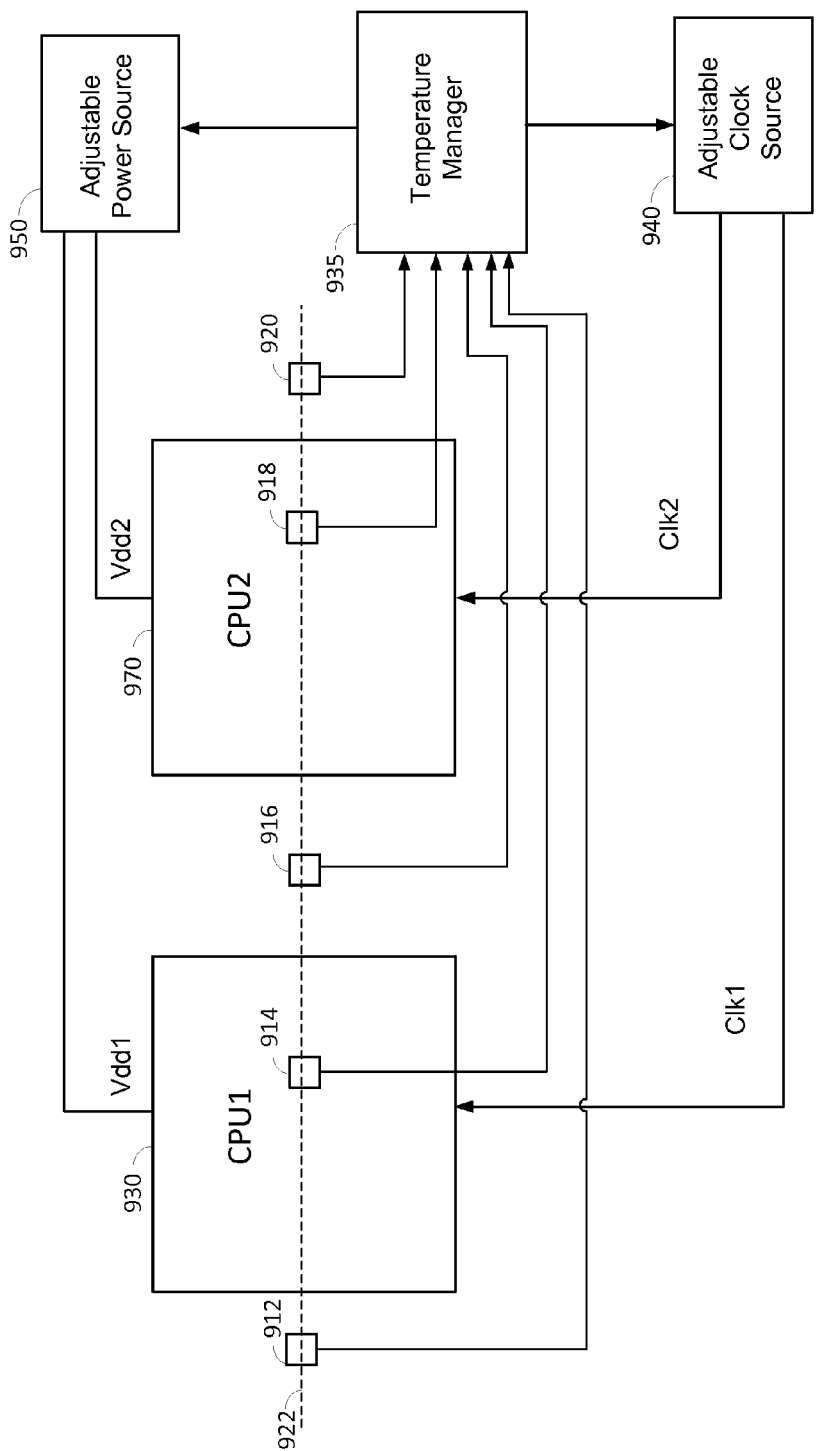
FIG. 9 shows an exemplary temperature management system comprising thermal sensors arranged in a first configuration for managing temperature for two CPUs according to certain aspects of the present disclosure.

It is to be appreciated that the temperature manager 220 is not limited to one CPU, and may manage temperature for two or more CPUs (e.g., in a multi-core system). In this regard, FIG. 9 shows an exemplary temperature management system configured to manage temperature for a first CPU 930 and a second CPU 970 according to certain aspects of the present disclosure. The temperature management system may comprise a temperature manager 935, an adjustable clock source 940, and an adjustable power source 950.

The temperature manage system further comprises a plurality of thermal sensors 912, 914, 916, 918 and 920 aligned along a line 922 intersecting the first and second CPUs 930 and 970. More particularly, the temperature manage system comprises a first thermal sensor 912 located on one side of the first CPU 930, a second thermal sensor 914 located within the first CPU 930, a third thermal sensor 918 located between the first and second CPUs 930 and 970, a fourth thermal sensor located within the second CPU 970, and a fifth thermal sensor 920 located on a side of the second CPU 970 that is opposite the first CPU 930. Each of the thermal sensors is configured to measure temperature at its location, and send the corresponding thermal readings to the temperature manager 935, as discussed further below.

The adjustable clock source 940 is configured to generate a first clock signal (denoted "Clk1") for the first CPU 930, a second clock signal (denoted "Clk2") for the second CPU 970, and to independently adjust the frequencies of the first and second clocks signal under the control of the temperature manager 935. This allows the temperature manager 935 to independently adjust (scale) the operating frequencies of the first CPU 930 and the second CPU 970 by independently adjusting the frequencies of the first and second clock signals Clk1 and Clk2.

The adjustable power source 950 is configured to provide a first supply voltage (denoted "Vdd1") to the first CPU 930, a second supply voltage (denoted "Vdd2") to the second CPU 970, and to independently adjust the first and second supply voltages Vdd1 and Vdd2 under the control of the temperature manager 935. This allows the temperature manager 935 to independently adjust (scale) the supply voltages of the first and second CPUs 930 and 970 by independently adjusting the first and second supply voltages Vdd1 and Vdd2.

In operation, the temperature manager 935 may manage the temperature of the first CPU 930 by receiving temperature readings from the first, second and third thermal sensors 912, 914 and 916, and fitting a temperature model (e.g., temperature model given in equation (1)) to the received temperature readings. After fitting the temperature model, the temperature manager 935 may determine a peak temperature using the temperature model, and use the determined peak temperature as an estimate of the hotspot temperature in the first CPU 930. The temperature manager 935 may then manage the temperature of the first CPU 930 based on the estimated hotspot temperature in the first CPU 930. For example, if the estimated hotspot temperature in the first CPU 930 exceeds a temperature threshold, the temperature manager 935 may initiate temperature mitigation to reduce the temperature of the first CPU 930. The temperature manager 935 may reduce the temperature by commanding the adjustable clock source 940 to reduce the frequency of the first clock signal Clk1, and/or commanding the adjustable power source 950 to reduce the first supply voltage Vdd1.

The temperature manager 935 may manage the temperature of the second CPU 970 by receiving temperature readings from the third, fourth and fifth thermal sensors 916, 918 and 920, and fitting a temperature model (e.g., temperature model given in equation (1)) to the received temperature readings. After fitting the temperature model, the temperature manager 935 may determine a peak temperature using the temperature model, and use the determined peak temperature as an estimate of the hotspot temperature in the second CPU 970. The temperature manager 935 may then manage the temperature of the second CPU 970 based on the estimated hotspot temperature in the second CPU 970. For example, if the estimated hotspot temperature in the second CPU 970 exceeds a temperature threshold, the temperature manager 935 may initiate temperature mitigation to reduce the temperature of the second CPU 970. The temperature manager 935 may reduce the temperature by commanding the adjustable clock source 940 to reduce the frequency of the second clock signal Clk2, and/or commanding the adjustable power source 950 to reduce the second supply voltage Vdd2.

In the example in FIG. 9, the temperature manager 930 uses temperature readings from the third thermal sensor 916 to manage temperature for both the first and second CPUs 930 and 970. Thus, the third thermal sensor 916 is shared by the first and second CPUs. However, it is to be appreciated that the present disclosure is not limited to this example. For example, the temperature management system in FIG. 9 may be modified to include two thermal sensors between the first and second CPUs along line 922, in which one of the two thermal sensors is located closer to the first CPU 930 and the other one of the two thermal sensors is located closer to the second CPU 970. In this example, the temperature manager 930 may use temperature readings from the thermal sensor located closer to the first CPU 930 and thermal sensors 912 and 914 for the first CPU 930, and use the thermal sensor located closer to the second CPU 970 and thermal sensors 918 and 920 for the second CPU 970.

Figure 10:
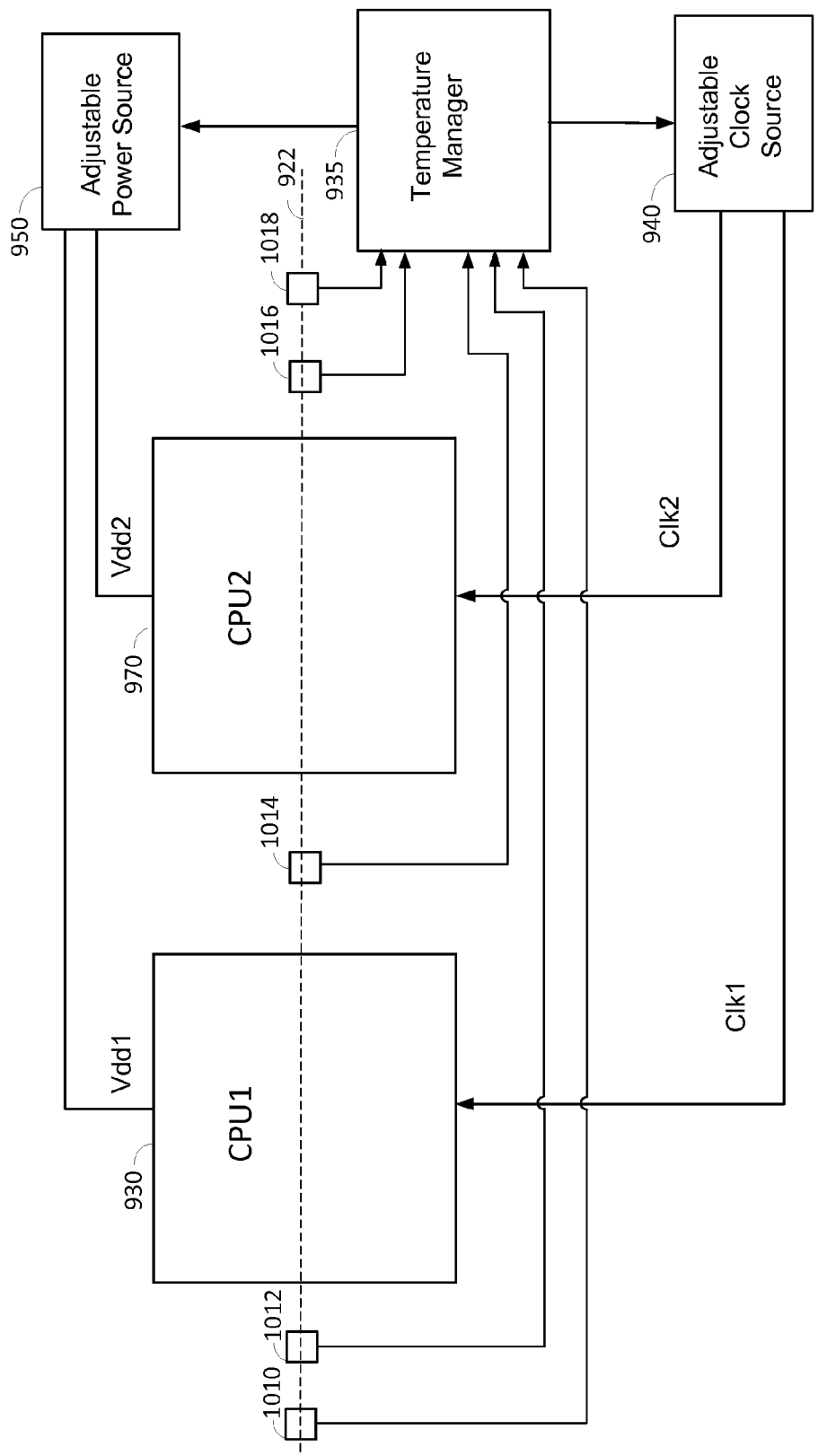
FIG. 10 shows an exemplary temperature management system comprising thermal sensors arranged in a second configuration for managing temperature for two CPUs according to certain aspects of the present disclosure.

FIG. 10 shows an exemplary temperature management system configured to manage temperature for the first CPU 930 and the second CPU 970 according to certain aspects of the present disclosure. In this example, the temperature manage system comprises a plurality of thermal sensors 1010, 1012, 1014, 1016 and 1018 aligned along line 922. More particularly, the temperature manage system comprises first and second thermal sensors 1010 and 1012 located on one side of the first CPU 930, a third thermal sensor 1014 located between the first and second CPUs 930 and 970, and fourth and fifth thermal sensors 1016 and 1018 located on a side of the second CPU 970 that is opposite the first CPU 930. Each of the thermal sensors is configured to measure temperature at its location, and send the corresponding thermal readings to the temperature manager 935, as discussed further below.

In operation, the temperature manager 935 may manage the temperature of the first CPU 930 by receiving temperature readings from the first, second and third thermal sensors 1010, 1012 and 1014, and fitting a temperature model (e.g., temperature model given in equation (1)) to the received temperature readings. After fitting the temperature model, the temperature manager 935 may determine a peak temperature using the temperature model, and use the determined peak temperature as an estimate of the hotspot temperature in the first CPU 930. The temperature manager 935 may then manage the temperature of the first CPU 930 based on the estimated hotspot temperature in the first CPU 930, as discussed above.

The temperature manager 935 may manage the temperature of the second CPU 970 by receiving temperature readings from the third, fourth and fifth thermal sensors 1014, 1016 and 1018, and fitting a temperature model (e.g., temperature model given in equation (1)) to the received temperature readings. After fitting the temperature model, the temperature manager 935 may determine a peak temperature using the temperature model, and use the determined peak temperature as an estimate of the hotspot temperature in the second CPU 970. The temperature manager 935 may then manage the temperature of the second CPU 970 based on the estimated hotspot temperature in the second CPU 970, as discussed above.

In certain aspects, the temperature manager 220 or 935 may use one thermal sensor when the system is not close to temperature mitigation to conserve power. For example, the temperature manager 220 or 935 may initially receive temperature readings from a single thermal sensor, and compare each temperature reading to a low temperature threshold (e.g., 70 degrees Celsius). If a temperature reading is below the low threshold, then the temperature manager 220 or 935 may continue to only monitor the single thermal sensor. This may be based on the assumption that when the temperature readings from the single thermal sensor are relatively low (e.g., below 70 degrees Celsius), the system is not close to needing temperature mitigation. If a temperature reading from the single thermal sensor exceeds the low temperature threshold, then the temperature manager 220 or 935 may start monitoring multiple thermal sensors (e.g., all of the thermal sensors), and manage the temperature of the CPU as discussed above.

The single thermal sensor may correspond to the thermal sensor that is expected to be closest to a hotspot. For instance, for the example shown in FIG. 4, the single thermal sensor may correspond to thermal sensor 412. For the example shown in FIG. 4, the single thermal sensor may correspond to thermal sensor 212 or 214 (thermal sensors closest to the CPU 130).

Figure 11:
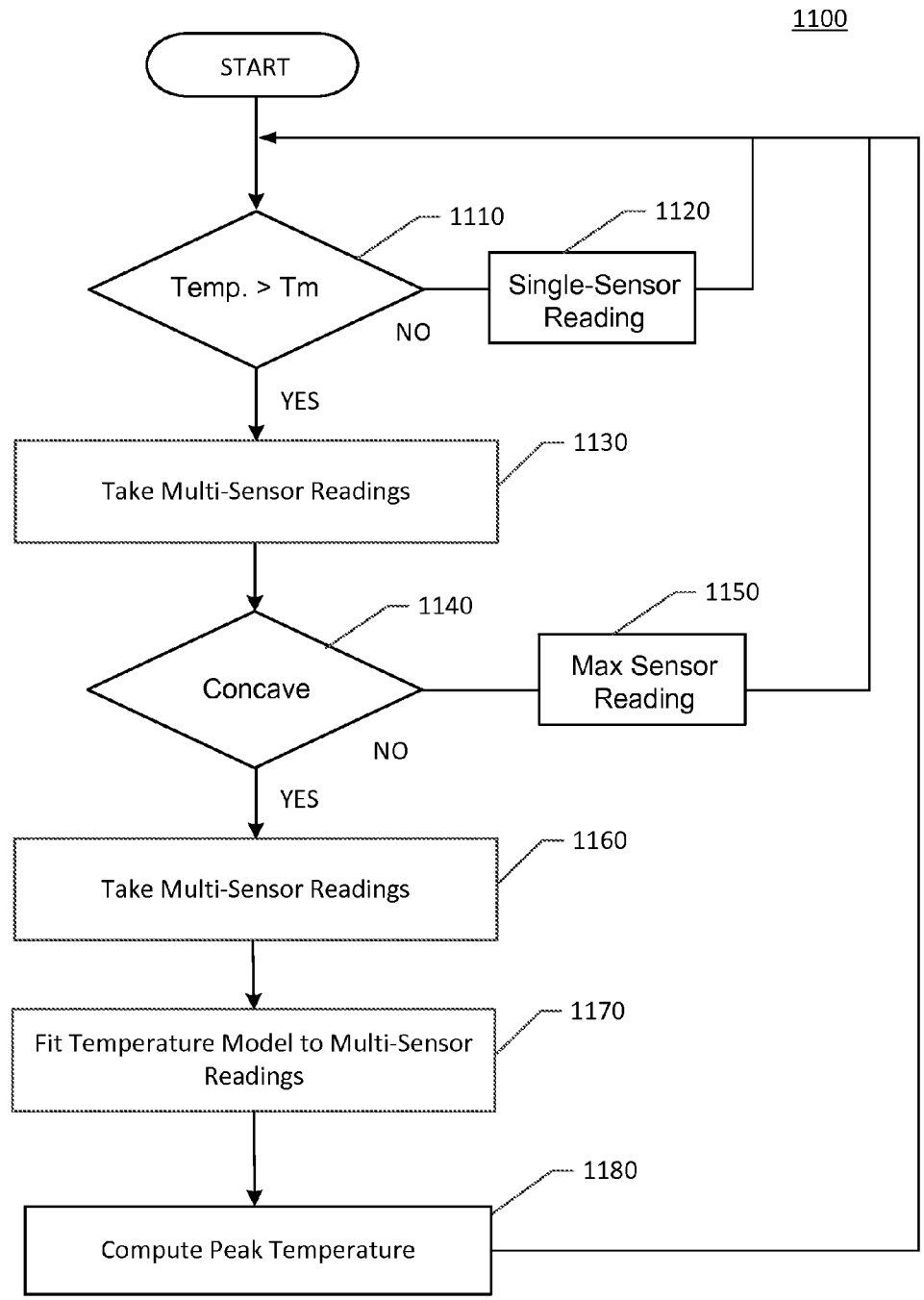
FIG. 11 is a flowchart illustrating exemplary operations of a temperature manager according to certain aspects of the present disclosure.

FIG. 11 is a flowchart illustrating exemplary operations 1100 of the temperature manager 220 or 935 according to certain aspects. Initially, the temperature manager 220 or 935 monitors temperature readings from a single thermal sensor, as discussed above.

In step 1110, the temperature manager determines whether a temperature reading from the single thermal sensors exceeds a low temperature threshold (denoted "Tm"). If the low temperature threshold is not exceeded, then the temperature manager continues to monitor temperature readings from the single sensor in step 1120. Otherwise, the temperature manager proceeds to step 1130.

In step 1130, the temperature manager monitors temperature readings from multiple thermal sensors (e.g., thermal sensors around a CPU). In step 1140, the temperature manager determines whether the temperature readings from the multiple thermal sensors correspond to a concave curve (e.g., concave curve 310). If the temperature readings do not correspond to a concave curve (e.g., correspond to a convex curve), then the temperature manager performs temperature management based on the maximum temperature reading from the multiple thermal sensors in step 1150. For example, the temperature manager may compare the maximum temperature reading to a first temperature threshold, and initiate temperature mitigation when the maximum temperature reading exceeds the first temperature threshold. If the temperature readings from the multiple thermal sensors correspond to a concave curve, then the temperature manager may proceed to step 1160.

In step 1160, the temperature manager takes temperature readings from the multiple thermal sensors. In step 1170, the temperature manager fits a temperature model to the temperature readings, and, in step 1180, the temperature manager computes a peak temperature using the fitted temperature model. The temperature manager may use the peak temperature as an estimate of a hotspot temperature. In this example, the temperature manager may initiate temperature mitigation when the estimated hotspot temperature exceeds a second temperature threshold. The second temperature threshold may be higher than the first temperature threshold. This is because a larger budget may be built into the first temperature threshold assuming the estimated hotspot temperature provides a more accurate indication of the hotspot temperature than the maximum temperature reading.

As discussed above, the temperature manager determines whether the temperature readings from the multiple thermal sensors correspond to a concave curve in step 1140. For the example in FIG. 2, the temperature manager may do this by comparing the temperature readings from thermal sensors 210 and 212. If the temperature reading from thermal sensor 212 is higher than the temperature reading from thermal sensor 210, then the temperature manager may determine a concave curve in step 1140. If, on the other hand, the temperature reading from thermal sensor 212 is lower than the temperature reading from thermal sensor 210, then the temperature manager may determine a convex curve in step 1140.

Figure 12A:
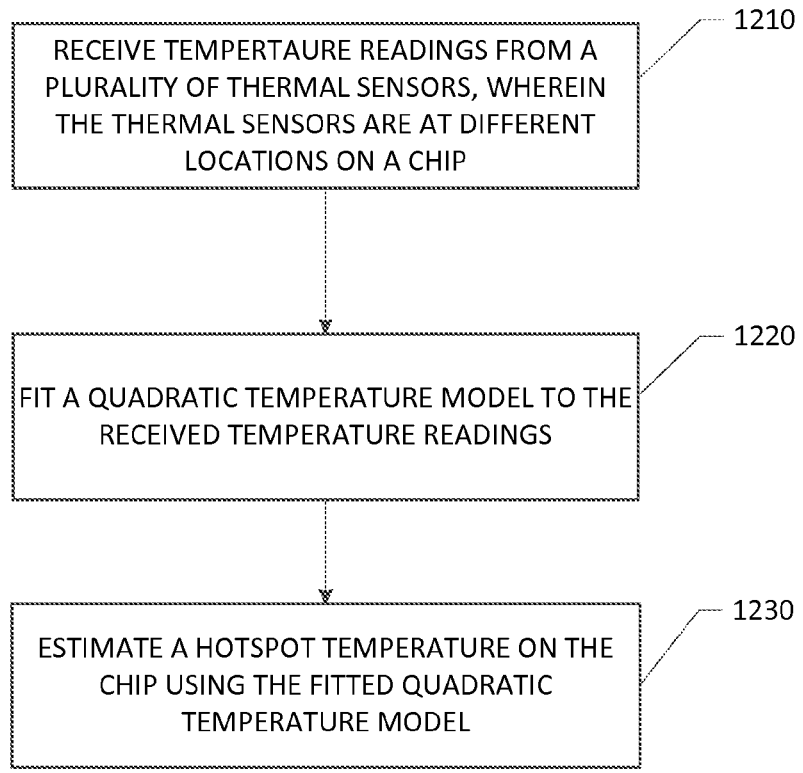
FIG. 12A is a flowchart of a method for managing temperature according to certain aspects of the present disclosure.

FIG. 12A is a flowchart illustrating a method 1200 for managing temperature according to an embodiment of the present disclosure. The method 1200 may be performed by the temperature manager 220 or 935.

In step 1210, a plurality of temperature readings are received from a plurality of thermal sensors, wherein the thermal sensors are at different locations on a chip. For example, the thermal sensors may include thermal sensors located around a processor (e.g., CPU). The thermal sensors may also include one or more thermal sensors located within the processor.

In step 1220, a quadratic temperature model is fitted to the received temperature readings. For example, the quadratic temperature model may define a concave temperature curve (e.g., curve 310) that is fitted to the temperature readings.

In step 1230, a hotspot temperature on the chip is estimated using the fitted quadratic temperature model. For example, the hotspot temperature may be estimated by determining a peak temperature of the fitted temperature model.

Figure 12B:
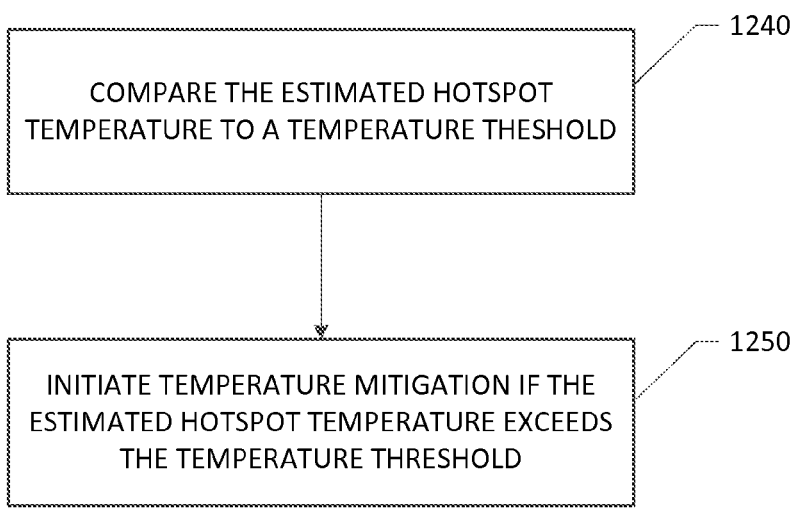
FIG. 12B is a flowchart of additional optional steps that may be performed in the method for managing temperature according to certain aspects of the present disclosure.

FIG. 12B is a flowchart illustrating additional optional steps that may be performed in the method 1200 for managing temperature according to certain aspects. In optional step 1240, the estimated hotspot temperature is compared to a temperature threshold. In optional step 1250, temperature mitigation is initiated if the estimated hotspot temperature exceeds the temperature threshold. The temperature mitigation may involve reducing the frequency of a clock signal, reducing a supply voltage, or both.

Although embodiments of the present disclosure are described above using the example of a CPU, it is to be appreciated that embodiments of the present disclosure are not limited to this example, and may be used to manage temperature for any type of processor or circuit. For example, any of the temperature management systems shown in FIGS. 2 and 4-10 may be used to manage temperature for a GPU, a modem, etc. by replacing the CPU with a GPU, a modem, etc.

The temperature manager according to any of the embodiments discussed above may be implemented with a general-purpose processor, a digital signal processor (DSP), an application specific integrated circuit (ASIC), a field programmable gate array (FPGA) or other programmable logic device, discrete hardware components, or any combination thereof designed to perform the functions described herein. A general-purpose processor may be a microprocessor, but in the alternative, the processor may be any conventional processor, controller, microcontroller, or state machine. A processor may perform the functions described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:
1. A temperature management system, comprising:
a plurality of thermal sensors at different locations on a chip, the chip including a processor, wherein thermal sensors of the plurality of thermal sensors are configured to provide a plurality of temperature readings, wherein the thermal sensors of the plurality of thermal sensors are all located outside of the processor, wherein at least three of the thermal sensors of the plurality of thermal sensors are aligned along a line to enable interpolation of temperatures at locations on or near the line, and wherein the line is positioned to intersect a portion of the processor to enable estimation of a hotspot temperature on the chip at a location within the processor; and a temperature manager configured to receive the plurality of temperature readings from the thermal sensors of the plurality of thermal sensors, to fit a temperature model to the received temperature readings, and to estimate the hotspot temperature on the chip using the fitted temperature model, wherein the estimated hotspot temperature corresponds to the location within the processor.

2. The system of claim 1, wherein the temperature manager is configured to
estimate the hotspot temperature by determining a peak temperature using the fitted temperature model.

3. The system of claim 2, wherein the fitted temperature model is a fitted quadratic temperature model, and wherein the temperature manager is configured to determine the peak temperature by setting a derivative of the fitted quadratic temperature model to zero to determine a location corresponding to the peak temperature, and inputting the determined location to the fitted quadratic temperature model to determine the peak temperature.

4. The system of claim 2, wherein the temperature manager is configured to determine the peak temperature by determining a plurality of temperatures at a plurality of different locations on the chip using the fitted temperature model, and selecting a highest one of the determined temperatures.

5. The system of claim 1, wherein the temperature manager is configured compare the estimated hotspot temperature to a temperature threshold, and to initiate temperature mitigation if the estimated hotspot temperature exceeds the temperature threshold.

6. The system of claim 5, wherein the temperature manager is configured to initiate temperature mitigation by commanding a clock source to reduce a frequency of a clock signal, commanding a power source to reduce a supply voltage, or both.

7. A method for managing temperature, comprising:
receiving a plurality of temperature readings from thermal sensors of a plurality of thermal sensors, wherein the thermal sensors of the plurality of thermal sensors are at different locations on a chip, wherein the thermal sensors of the plurality of thermal sensors are all located outside of a processor on the chip, wherein at least three of the thermal sensors of the plurality of thermal sensors are aligned along a line to enable interpolation of temperatures at locations on or near the line, and wherein the line is positioned to intersect a portion of the processor to enable estimation of a hotspot temperature on the chip at a location within the processor;
fitting a temperature model to the received temperature readings; and
estimating the hotspot temperature on the chip using the fitted temperature model, wherein the estimated hotspot temperature corresponds to the location within the processor.

8. The method of claim 7,
wherein estimating the hotspot temperature comprises determining a peak temperature using the fitted temperature model.

9. The method of claim 8, wherein the fitted temperature model is a fitted quadratic temperature model, and wherein determining the peak temperature comprises setting a derivative of the fitted quadratic temperature model to zero to determine a location corresponding to the peak temperature, and inputting the determined location to the fitted quadratic temperature model to determine the peak temperature.

10. The method of claim 8, wherein determining the peak temperature comprises determining a plurality of temperatures at a plurality of different locations on the chip using the fitted temperature model, and selecting a highest one of the determined temperatures.

11. The method of claim 7, further comprising comparing the estimated hotspot temperature to a temperature threshold, and initiating temperature mitigation if the estimated hotspot temperature exceeds the temperature threshold.

12. The method of claim 11, wherein initiating temperature mitigation comprises commanding a clock source to reduce a frequency of a clock signal, commanding a power source to reduce a supply voltage, or both.

13. An apparatus for managing temperature, comprising:
means for receiving a plurality of temperature readings from thermal sensors of a plurality of thermal sensors, wherein the thermal sensors of the plurality of thermal sensors are at different locations on a chip, wherein the thermal sensors of the plurality of thermal sensors are all located outside of a processor on the chip, wherein at least three of the thermal sensors of the plurality of thermal sensors are aligned along a line to enable interpolation of temperatures at locations on or near the line, and wherein the line is positioned to intersect a portion of the processor to enable estimation of a hotspot temperature on the chip at a location within the processor;
means for fitting a temperature model to the received temperature readings; and
means for estimating the hotspot temperature on the chip using the fitted temperature model, wherein the estimated hotspot temperature corresponds to the location within the processor.

14. The apparatus of claim 13,
wherein the means for estimating the hotspot temperature comprises means for determining a peak temperature using the fitted temperature model.

15. The apparatus of claim 14, wherein the fitted temperature model is a fitted quadratic temperature model, and wherein the means for determining the peak temperature comprises means for setting a derivative of the fitted quadratic temperature model to zero to determine a location corresponding to the peak temperature, and means for inputting the determined location to the fitted quadratic temperature model to determine the peak temperature.

16. The apparatus of claim 14, wherein the means for determining the peak temperature comprises means for determining a plurality of temperatures at a plurality of different locations on the chip using the fitted temperature model, and means for selecting a highest one of the determined temperatures.

17. The apparatus of claim 13, further comprising means for comparing the estimated hotspot temperature to a temperature threshold, and means for initiating temperature mitigation if the estimated hotspot temperature exceeds the temperature threshold.

18. The apparatus of claim 17, wherein the means for initiating temperature mitigation comprises means for commanding a clock source to reduce a frequency of a clock signal, means for commanding a power source to reduce a supply voltage, or both.

19. A computer-readable medium comprising instructions stored thereon that, when executed by a processor, cause the processor to:
- receive a plurality of temperature readings from thermal sensors of a plurality of thermal sensors, wherein the thermal sensors of the plurality of thermal sensors are at different locations on a chip, wherein the thermal sensors of the plurality of thermal sensors are all located outside of a processor on the chip, wherein at least three of the thermal sensors of the plurality of thermal sensors are aligned along a line to enable interpolation of temperatures at locations on or near the line, and wherein the line is positioned to intersect a portion of the processor to enable estimation of a hotspot temperature on the chip at a location within the processor;
- fit a temperature model to the received temperature readings; and
- estimate the hotspot temperature on the chip using the fitted temperature model, wherein the estimated hotspot temperature corresponds to the location within the processor.

* * * * *